United States Patent [19]

Rodriguez

[11] Patent Number: 4,511,886

[45] Date of Patent: Apr. 16, 1985

[54] ELECTRONIC SECURITY AND SURVEILLANCE SYSTEM

[75] Inventor: Michael J. Rodriguez, Lilburn, Ga.

[73] Assignee: Micron International, Ltd., Tucker, Ga.

[21] Appl. No.: 538,848

[22] Filed: Oct. 6, 1983

Related U.S. Application Data

[63] Continuation-in-part of Ser. No. 499,946, Jun. 1, 1983, abandoned.

[51] Int. Cl.[3] .......................... G08B 1/08; H04N 7/18

[52] U.S. Cl. .................................... 340/534; 340/506; 340/531; 358/105; 358/108

[58] Field of Search ............... 340/534, 531, 506, 521, 340/825.06; 358/105, 108

[56] References Cited

U.S. PATENT DOCUMENTS 4,257,063 3/1981 Loughry et al. .................... 358/108
4,455,550 6/1984 Iguchi ................................ 358/108

*Primary Examiner*—Donnie L. Crosland
*Attorney, Agent, or Firm*—J. Rodgers Lunsford, III; Dale Lischer; William R. Cohrs

[57] ABSTRACT

A security and surveillance system having a central monitoring station connected to a plurality of remote installations or subscribers by a transmission medium having a finite bandwidth. Each remote installation includes a plurality of surveillance equipment, including video, audio, and alarm signals, associated with a plurality of monitored locations. The security information collected by the surveillance equipment is serially sampled by a switcher which provides that information to an interface unit transmitter. The interface unit transmitter compresses the video information and decodes the alarm information and then using a key frequency and single side band modulation techniques modulates and sub-channelizes the processed security information into a frequency spectrum. The sub-channelized security information is translated in frequency and transmitted on the transmission medium. The information received at the central station is demodulated, and the alarm information monitored by means of a command computer. The system provides an upstream command channel so that the central station can communicate with each remote installation. The central station generates a master randomly varying reference frequency which is used to produce all of the unique key frequencies for each remote installation. There is also provided a back up on-site recorder and an alternative downstream transmission capability.

5 Claims, 8 Drawing Figures

ELECTRONIC SECURITY AND SURVEILLANCE SYSTEM

This application is a continuation-in-part of application Ser. No. 499,946, filed June 1, 1983, now abandoned.

BACKGROUND OF THE INVENTION

This invention relates generally to electronic security and surveillance systems for monitoring a large number of remote installations or facilities by a central monitoring station, and more particularly concerns electronic circuitry and methods for transmitting and receiving security information between each remote installation and the central monitoring station over a transmission medium having a finite information bandwidth.

In general a centrally monitored security and surveillance system includes on-site surveillance equipment installed at a remote facility, a central information monitoring station, and a transmission medium having a limited information bandwidth to interconnect the remote installation and the central station. In such a security system, the on-site surveillance equipment at the remote installation collects information, in electronic form, relating to the security status of the facility being monitored. The information collected by the on-site surveillance equipment is then transmitted via the transmission medium to a central monitoring station where the security information from the on-site surveillance equipment is monitored to determine the security status at the remote installation. When an alarm condition exists at one of the remote installations, the central monitoring station detects that alarm and responds accordingly, such as by calling police or fire fighters.

In prior art central monitored security systems, the on-site surveillance equipment at each remote installation monitors a number of on-site locations. The surveillance equipment often includes microphones, motion detectors, pressure sensors, shock sensors, fire detectors, and the like. The on-site surveillance equipment used in such prior art central monitored security systems collects only a limited amount of security data because the transmission medium can transmit only a limited amount of information to the central station due to its limited transmission capabilities. In some prior art residential central monitored security systems, for example, the security information collected at the remote installation is transmitted to the central monitoring systems, over telephone lines. Such a prior art central monitored security system is limited by the information bandwidth of a typical telephone circuit. Moreover, the expense of a dedicated telephone line results in such systems often relying on a nondedicated line which means that central monitoring of the remote facility is only available during an alarm condition.

Finally, prior art central monitored security systems have not been able to provide video monitoring at the remote facility because of the wide bandwidth required to transmit video information. Without video capability, prior art central monitored security systems cannot confirm whether an alarm signal received at the central station is true or false, and each alarm must be investigated independently by calling either the police or fire fighters.

In order to monitor a large number of remote facilities on a continuous basis and monitor video, audio, and alarm information at the central station, which is often required for large commercial installations, it is necessary to transmit a large amount of security information to the central monitoring station in a secured fashion and to be able to pinpoint the security information that is most important at the central monitoring station. It is also necessary to be able to confirm whether an alarm signal is true or false without sending police or fire fighters to the remote facility.

SUMMARY OF THE INVENTION

Therefore, it is an object of the present invention to provide a security and surveillance system having a central monitoring station which can continuously monitor security information including video, audio, and alarm signals from a large number of remote facilities, which information is collected by surveillance equipment at a number of on-site locations at the remote facility, is processed at the remote installation, and is transmitted to the central monitoring station over a single transmission medium having a finite information bandwidth.

It is a related object of the present invention to provide switching means and interface unit transmitter means at the remote facility being monitored to sample the security information, including video, audio, and alarm signals, collected by on-site surveillance equipment, to compress the video signal in bandwidth, and to modulate the information with an assigned key frequency in order to channelize the information onto the transmission medium.

It is similar object of the present invention to provide at the central monitoring station interface unit receiver means, master switching means, and a status and command computer in order to select the channelized security information, including video, audio, and alarm signals, from the transmission medium by demodulation, to expand and route the video information of interest to an auxiliary monitor, to monitor continuously the alarm information for each remote facility, and to generate and transmit commands to control the surveillance equipment at each on-site location to assure specific monitoring activity at the remote facility.

In order to achieve the above objects it is a further object of the present invention to use a key frequency and single side band modulation techniques to channelize the processed security information and thereby to assure full utilization of the available bandwidth of the transmission medium while minimizing the circuitry requirements of the system.

It is also an object of the present invention to provide video information in compressed form to the central monitoring station so as to provide all of the necessary security information while at the same time conserving bandwidth in the transmission medium.

It is likewise an important object of the present invention to provide a randomly varying master reference frequency at the central monitoring station which reference frequency controls all of the key frequencies for single side band modulators and demodulators in the security system in order to secure the information on the transmission medium from unauthorized interception.

Other objects and advantages of the invention will become apparent upon reading the following detailed description of the invention and upon reference to the drawings.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
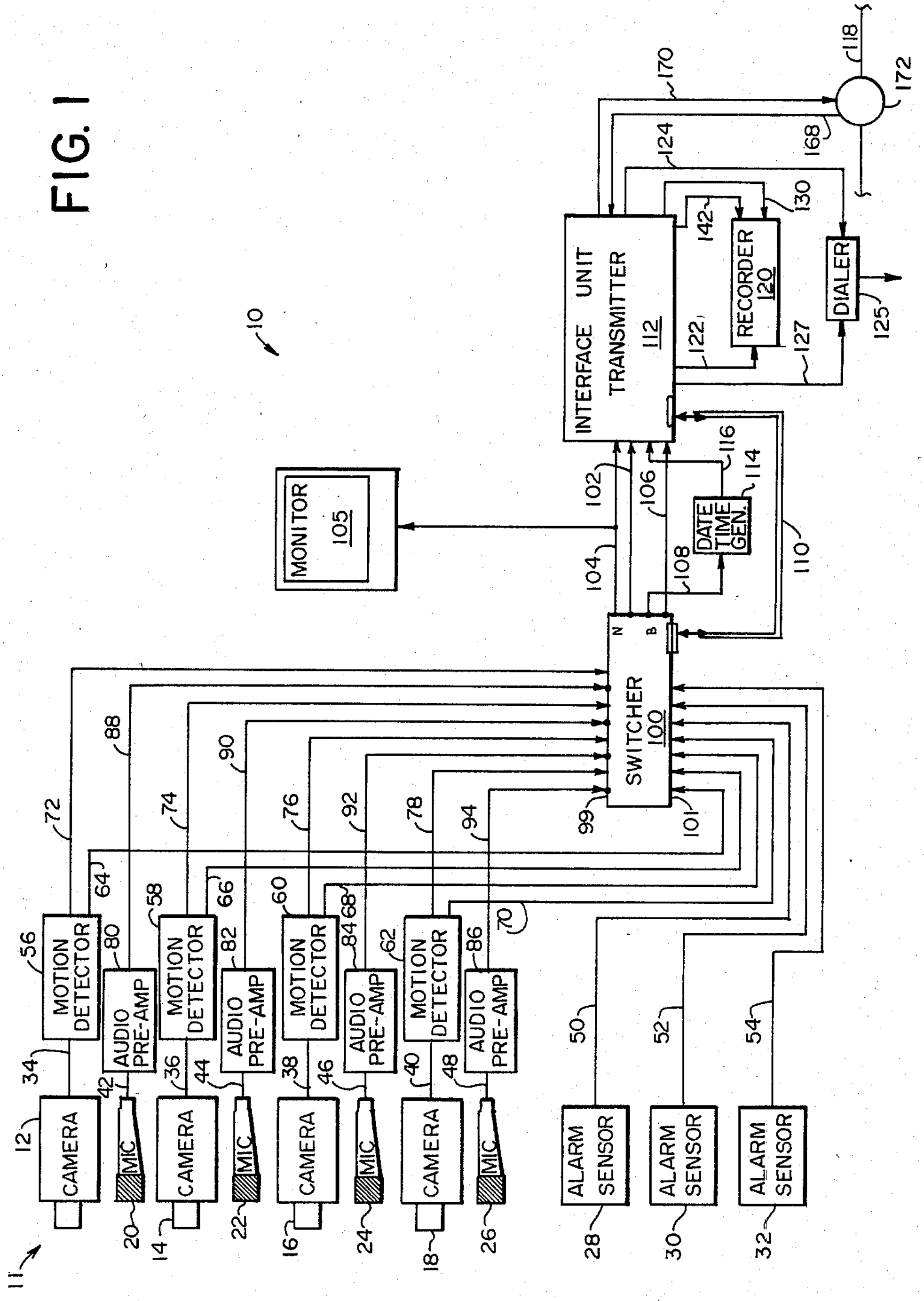
FIG. 1 is a block diagram showing the on-site surveillance equipment at the remote facility to be monitored.
Figure 5:
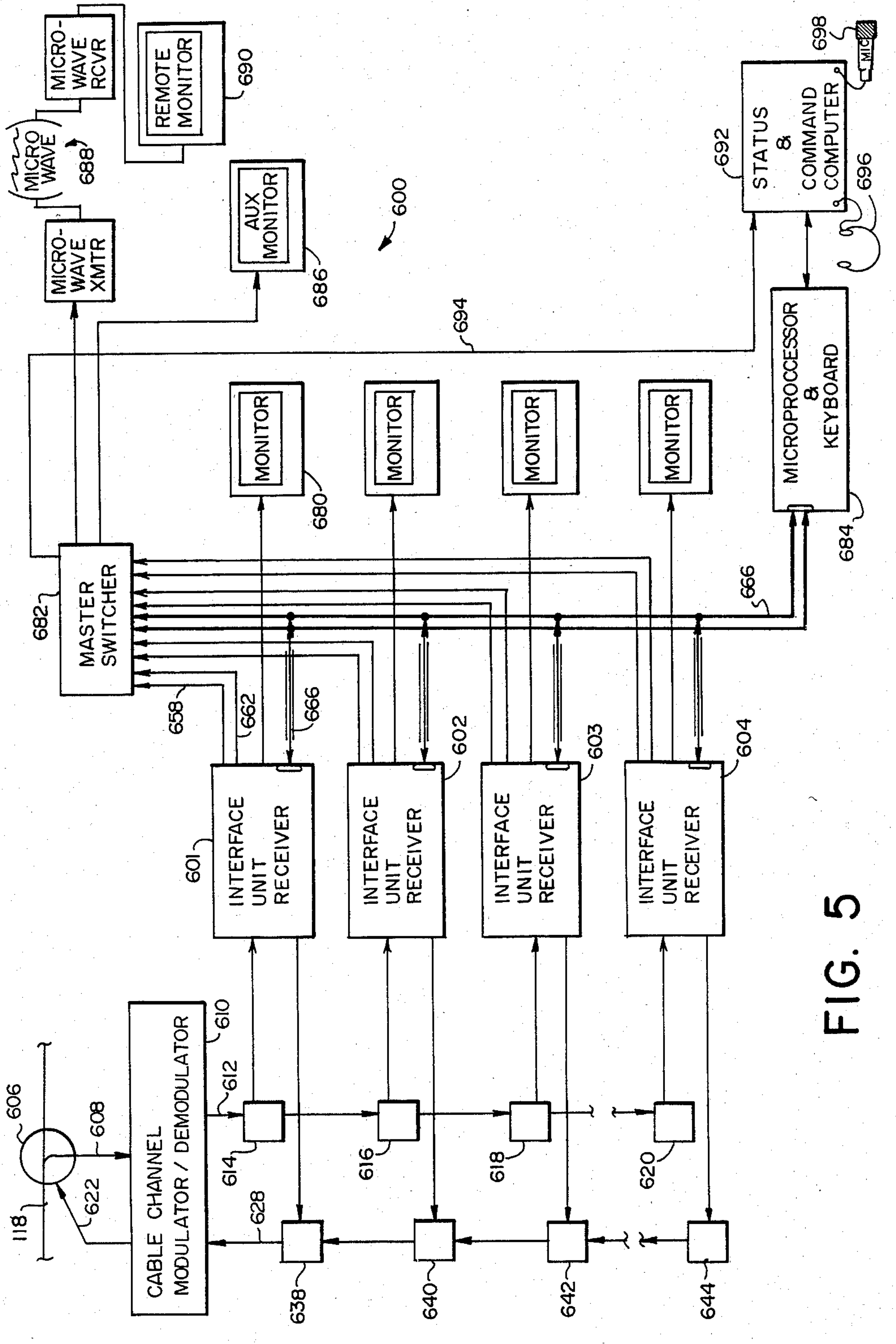
FIG. 5 is a block diagram of the central monitoring station equipment for continuously monitoring the security information receiced from the remote installation.

Turning to FIG. 1, there is shown a remote security installation 10 which comprises part of the present invention. The remote installation collects security information at a number of on-site locations and transmits that information via coaxial cable 118 (or other transmission medium) to a central station 600 (FIG. 5). The coaxial cable 118 may be part of an existing cable television system with one or two 6 mhz television channels allocated for use with the security system of the present invention.

The remote security installation 10 utilizes surveillance equipment 11 including television cameras 12, 14, 16, and 18 each having an associated microphone 20, 22, 24, or 26. The cameras 12, 14, 16, and 18 produce a typical video signal on lines 34, 36, 38, and 40. The microphones 20, 22, 24, and 26 produce a standard audio signal on lines 42, 44, 46, and 48. The audio signals on lines 42, 44, 46, and 48 are respectively amplified by audio amplifiers 80, 82, 84, and 86 and produce an amplified audio analog signal on lines 88, 90, 92, and 94. The video signals on lines 34, 36, 38, and 40 are connected through motion detectors 56, 58, 60, and 62 to video lines 72, 74, 76, and 78. The video and audio signals on lines 72, 74, 76, 78, 88, 90, 92, and 94 are connected in associated pairs to the analog video and audio inputs 99 of switcher 100.

Alarm signals are produced by motion detectors 56, 58, 60, and 62, which motion detectors monitor the video signals on lines 34, 36, 38, and 40 respectively and determine when those video signals experience a change thereby indicating that something has moved in front of the camera. Motion detectors 56, 58, 60, and 62 produce alarm signals on output lines 64, 66, 68, and 70 respectively. These motion detectors may be switched on or off depending upon whether the scene to be monitored is active or passive.

Alarm sensors 28, 30, and 32 are also provided, and each is associated with a camera and microphone pair. The alarm sensors 28, 30, and 32 may be motion detectors, pressure sensors, fire detectors, or other known security alarm sensors. The alarm sensors 28, 30, and 32 produce alarm signals on lines 50, 52, and 54 in response to alarm conditions such as smoke, fire, the motion on an intruder, or the weight of an intruder. The alarm signals on lines 50, 52, 54, 64, 66, 68, and 70 are connected to alarm inputs 101 of switcher 100.

The switcher 100 continuously and sequentially samples each pair of audio and video signals at inputs 99 and sequentially connects each pair of audio and video signals to its normal output terminals 102 and 104, line 102 being the audio output and line 104 being the video output which is continuously displayed on monitor 105. The switcher 100 is constructed so that its dwell time on any given pair of audio and video signals can be adjusted to insure that more critical locations can be scrutinized more carefully by a camera and a microphone (e.g. the cash register).

As long as no alarm condition exists, the switcher 100 continuously samples the audio and video signals at its inputs 99 and connects those signals sequentially to its normal audio and video output lines 102 and 104. The audio and video signals on lines 102 and 104 are fed to interface unit transmitter 112. The interface unit transmitter 112 converts the video signals to audio frequency (which are referred to hereinafter as compressed or slow scan video signals), sub-channelizes the audio signals and the slow scan video signals and modulates a randomly varying key frequency, and transmits those signals downstream via coaxial cable 118 to central station 600 (FIG. 5). The interface unit transmitter 112 also provides a two way alarm and command sub-channel between the remote installation and the central station. The interface unit transmitter 112 will be described in greater detail in connection with FIG. 2.

Upon the occurrence of an alarm condition on lines 50, 52, 54, 64, 66, 68, or 70, the switcher 100 automatically locks onto the camera and microphone location which corresponds to the particular alarm and connects the signal from that camera and microphone directly to the switcher's bridging audio and video output lines 106 and 108. Line 106 is the alarm condition audio output, and line 108 in the alarm condition video output. As long as the alarm condition exists, the audio and video signals from the alarm location will be continuously connected to bridging terminals 106 and 108.

Also during an alarm condition, the bridged video output signal on line 108 is fed to a date/time generator 114 which superimposes the date and time onto the video signal before the video signal is connected to the input 116 of the interface unit transmitter 112.

At the occurrence of an alarm condition, the interface unit transmitter 112 also starts on-site recorder 120 by means of a command signal on line 122 and feeds the slow scan video signal and audio signal for the alarm condition location to the on-site recorder 120 via lines 142 and 130 respectively to assure security information is not lost because of a transmission medium failure (e.g., a cut cable) between the remote facility and the central station.

In addition to the on-site recorder 120, the interface unit transmitter 112 can also activate a high speed dialer 125 by a command on line 127 when the cable 118 is not functional and there is an alarm condition. The high speed dialer connects the audio signal (line 124) from the alarm location to the central station 600 over a standard telephone line. Periodically the audio signal (line 124) is automatically interrupted and a slow scan video signal is transmitted for the alarm location for a short time.

As previously stated, the interface unit transmitter 112 also provides a separate two-way alarm and command sub-channel to the central station in order to transmit an alarm code downstream to the central station 600 via cable 118 and to receive upstream commands from the central station. The interface unit transmitter receives the alarm signal from the switcher on two-way bus 110, identifies the location by decoding the alarm signal, and transmits the resulting alarm code on the alarm sub-channel to the central station 600 via coaxial cable 118. While the interface unit transmitter 112 does operate as a receiver for command signals from the central station, the terminology "transmitter" has been adopted to reflect the primary function of interface unit transmitter 112 in transmitting processed security information downstream to the central station.

Figure 2:
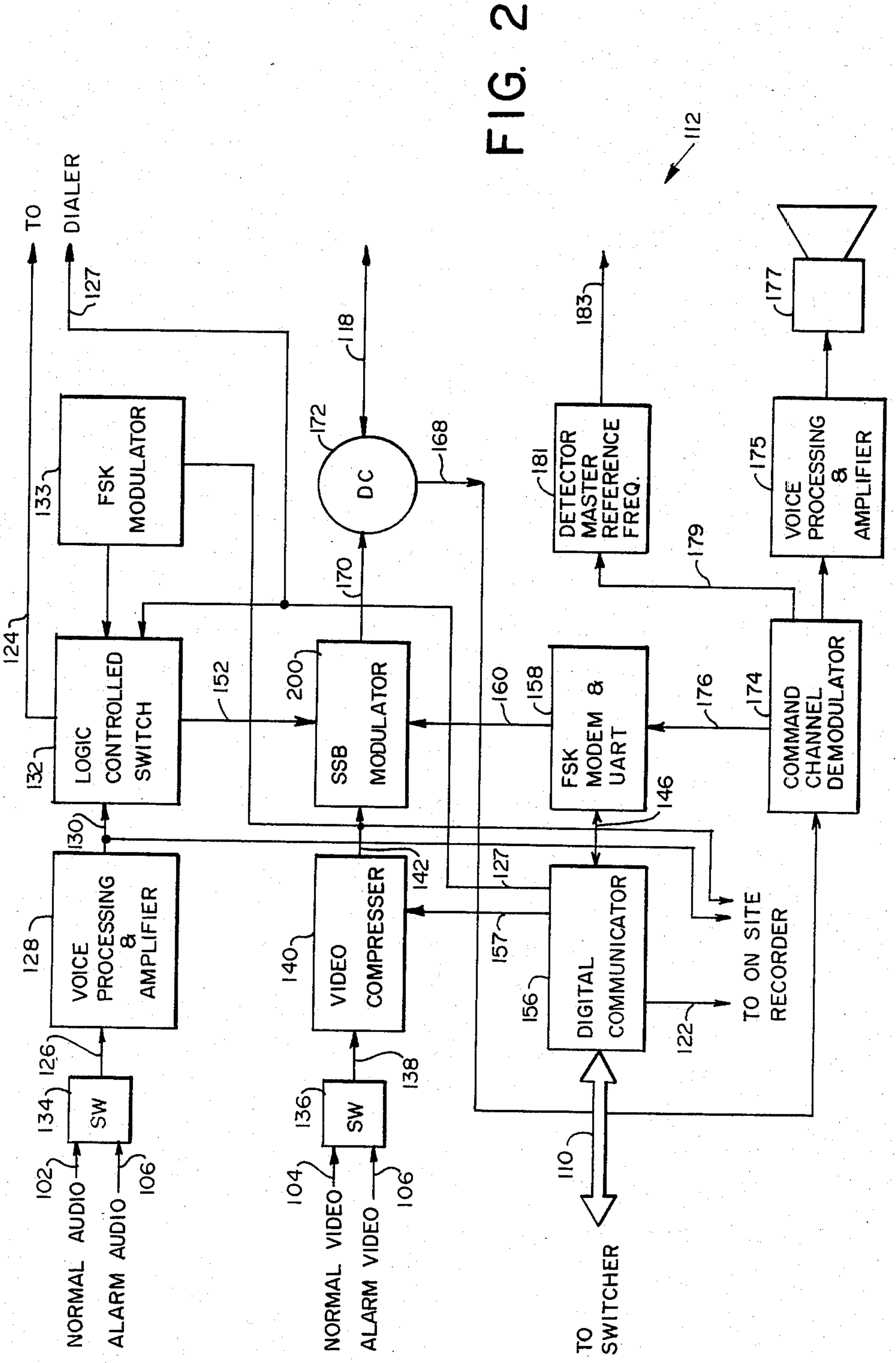
FIG. 2 is a block diagram of the interface unit transmitter which is part of the on-site surveillance equipment.

Turning to FIG. 2, there is shown a block diagram for the interface unit transmitter 112 which can execute the security monitoring functions previously described. The audio signals from the switcher 100 are connected to the interface unit transmitter 112 via input line 102 (normal audio input) and line 106 (alarm audio input). The audio inputs are connected to priority switch 134 which always gives the alarm audio signal (line 106) priority whenever it is present.

The audio signal from the priority switch output 126 is connected to audio processing and amplifier 128. The audio processing and amplifier 128 performs conventional audio processing including speech clipping and average energy level control and provides an output signal on line 130 which is connected to logic switch 132. Logic switch 132 connects the audio signal either to single sideband modulator 200 via line 152 or to the high speed dialer 125 via line 124. The operation of the single side band modulator 200 will be described in greater detail in connection with FIG. 3.

The video signals from switcher 100 on line 104 (normal video) and line 116 (alarm video) are connected to priority switch 136 which, like audio priority switch 134, gives priority to the alarm video signal. The output 138 of priority switch 136 is connected to video compressor 140.

The video compressor 140 converts the real time video signal into digital form by sampling and quantizing the video signal into six digital bits at a rate of 9 mhz. The digital bits are then stored in a 197 k-byte memory (141, FIG. 4) and read out of that memory at a much lower rate. For a slow, slow scan rate, the memory is read at a 31.5 khz rate, and the video picture at the central station is refreshed every 4 seconds. For a faster, slow scan rate, the memory is read at a 350 khz rate, and the video picture is refreshed every 0.2 seconds. The slower, slow scan rate (4 sec. refresh) is used during normal monitoring and the faster, slow scan rate (0.2 sec. refresh) is used during an alarm condition. The operation of the video compressor 140 will be described in greater detail in connection with FIG. 4.

With continuing reference to FIG. 2, the slow scan video signal (either fast slow or slow slow) on line 142 from video compressor 140 is connected to the single side band modulator 200, to the on-site recorder, and to the logic switch 132 via frequency shift keying ("FSK") modulator 133. FSK modulator 133 converts the slow scan video signal to a frequency shift keying signal (a form of narrow band FM which is compatible with telephone circuitry) before it is transmitted to the central station via the high-speed dialer and telephone line. When the cable is down and an alarm condition exists, the logic switch 132 initiates a periodic interrupt of the audio signal so that the video signal can be transmitted for a short time over the telephone line.

In addition to receiving audio and video signals from switcher 100, the interface unit transmitter 112 also receives alarm signals from and transmits command signals to switcher 100 via two-way bus 110. In FIG. 2, the alarm signals on bus 110 are received by interface unit transmitter 112 from switcher 100 on ten separate lines of bus 110. The alarm signals are produced in switcher 100 by means of open or closed switch contacts. Bus 110 is connected to the digital communicator 156 which converts the alarm signals on bus 110 to a digital code and transmits the resulting alarm code via line 146 to frequency shift keying ("FSK") modem and universal asychronous receiver transmitter ("UART") 158. The UART converts the parallel digitally coded alarm information into a serial format. These pulses are converted by an FSK modulator into narrow band FM signals, and the UART sends the resulting FSK alarm code on line 160 to single side band modulator 200 where it is combined with the video and audio signals.

Single side band modulator 200 by means of an assigned key frequency selects a particular sub-channel within a predetermined 6 mhz cable channel which sub-channel within the cable channel is assigned to the particular remote facility being monitored. The resulting signal containing all of the necessary processed security information from that particular remote facility is connected via line 170 through directional coupler 172 to the cable 118 and then to the central station. The operation of single side band modulator 200 will be more fully described in connection with FIG. 3.

When operating as a receiver, interface unit transmitter 112 in FIG. 2 receives upstream command signals from the central station through directional coupler 172 and line 168. The command signals on line 168 are detected by the command single side band demodulator 174 (which includes a standard cable channel demodulator) and are connected to the FSK modem and UART 158 via line 176. The FSK modem and UART 158 in conjunction with the digital communicator 156 decode the command information available on line 176 and transmit commands to switcher 100 via bus 110.

The upstream command sub-channel provides two other important functions. First the command sub-channel allows for voice communication from the central station personnel to the personnel at remote facility in order to assist in confirming whether an alarm condition is true or false. Second, and of great importance to the present invention, the command sub-channel carries a randomly varying master reference frequency which is used to synchronize the key frequencies for the modulators in the entire security system.

The voice information on the command channel is recovered by demodulator 174, voice processing amplifier 175, and speaker 177. The demodulator 174 detects the suppressed carrier of the command sub-channel transmitted from the central station. The suppressed carrier of the command sub-channel is the randomly varying master reference frequency for the entire security system. The master reference frequency is connected via line 179 to master reference frequency detector 181 which shapes and amplifies the master reference frequency and makes it available on line 183. The use of the master reference frequency will be described in greater detail below.

As previously described, the interface unit transmitter 112 controls several security functions during an alarm condition. With reference to FIG. 2, the digital communicator 156 receives the alarm signal on bus 110 from switcher 100, starts the on-site recorder 120 by a command on line 122, instructs the video compressor 140 to switch to its faster, slow scan by a command on line 157, and provides the identification of the location of the alarm by an alarm code on line 146. If during an alarm condition the cable fails, the digital communicator 156 detects that fault by the absence of upstream command signals and activates the high speed dialer 125 by an alert signal on line 127, which alert signal also activates logic switch 132 so that the voice signal (and periodically the video signal) is connected by logic switch 132 to the high-speed dialer and thus to the telephone line.

An important aspect of the present invention is to provide video monitoring by compressing the broad band video signal on line 138 (FIG. 2) to provide a narrow band or slow scan video signal for transmission. Video compressor 140 shown in FIG. 4 accomplishes the required video signal compression. The video signal on line 138 is connected to signal conditioning amplifier 400 which amplifies and conditions the broad band video signal and makes the signal available on output lines 402, 404, and 406. The video signal on line 402 is fed to frame start detector 408 which detects the beginning of each frame of video information and produces a clock start pulse on line 410. The clock start pulse on line 410 synchronizes master clock 412 which controls sampling generator 414 (read in) by means of output 416 and scanning clock 418 (read out) by means of output 420. The master clock 412 controls the basic input sampling rate which for video compression is preferably 9 mhz. The master clock 412 also controls the memory read out rate which is preferably 31.5 khz for a slower slow scan rate with a video picture at the central station refreshed every 4 seconds or 350 khz for a faster slow scan rate where the video picture at the central station is refreshed every 0.2 seconds. The video compressor 140 selects the slow, slow scan rate or the fast slow scan rate by means of an alarm condition signal on line 157 from the digital communicator 156 when there is an alarm condition.

The video signal on line 406 is connected to analog converter 422. The sampling generator 414 produces the 9 mhz sampling signal on line 424 which samples the video information on line 406 at the 9 mhz rate. The A/D converter 422 quantizes the video signal into 6 digital bits which are stored in memory 141. Memory 141 comprises a 197 k-byte memory which is sequentially addressed by counter 426. Once a frame of information has been converted by A/D converter 422 and stored in memory 141, the address counter 426 recycles and the information is read out of the memory at the slower read rate of either 31.5 khz (slow slow scan) or 350 khz (fast slow scan). The 31.5 khz rate or 350 khz rate produced by scan clock 418 is connected via line 428 to D/A converter 430 which sequentially converts the digital information from memory 141 back to analog information and provides the analog compressed video signal on line 432.

The compressed analog video signal on line 432 is then combined with the sync and blanking signals at combiner 434. The sync and blanking signals are recovered by sync separator and regenerator 436 from the broad band video signal on line 404. And the scanning clock 418 produces a scan clock signal output on line 438 which is used in connection with sync separator and regenerator 436 to produce the required sync and blanking signals on line 440. The output 142 of the sync and blanking combiner 434 which is the compressed video signal is then connected to single side band modulator 200 for transmission to the central station, to FSK modulator 133 for transmission to the high speed dialer, or to on-site recorder 120 for storage at the remote installation (FIG. 2).

As previously discussed, the processed security information, including compressed video, audio, and alarm codes, is modulated by single side band techniques and transmitted to the central station on a sub-channel within a 6 mhz cable channel. Each remote facility is assigned its own particular secret sub-channel carrier frequency or key frequency ($f_c$) to assure security. Moreover, to assure even greater security the sub-channel key frequency ($f_c$) for each remote facility randomly varies in accordance with the master reference frequency so that unauthorized downstream interception of the processed security information is impossible even if the nominal value of $f_c$ is known.

In order to modulate and transmit the processed security information in such a secure fashion, the single side band modulator 200 of interface unit transmitter 112 (FIG. 3A) comprises three separate "Weaver Method" modulators, video single side band modulator 202, audio single side band modulator 204, and alarm code single side band modulator 206. In addition, the single side band modulator 200 includes individual sub-channel carrier frequency generating circuit 208 (FIG. 3B) which generates the predetermined sub-channel key frequency $f_c$, assigned to the particular remote facility, and uses the master reference frequency on line 183 to randomly vary $f_c$.

Figure 3A:
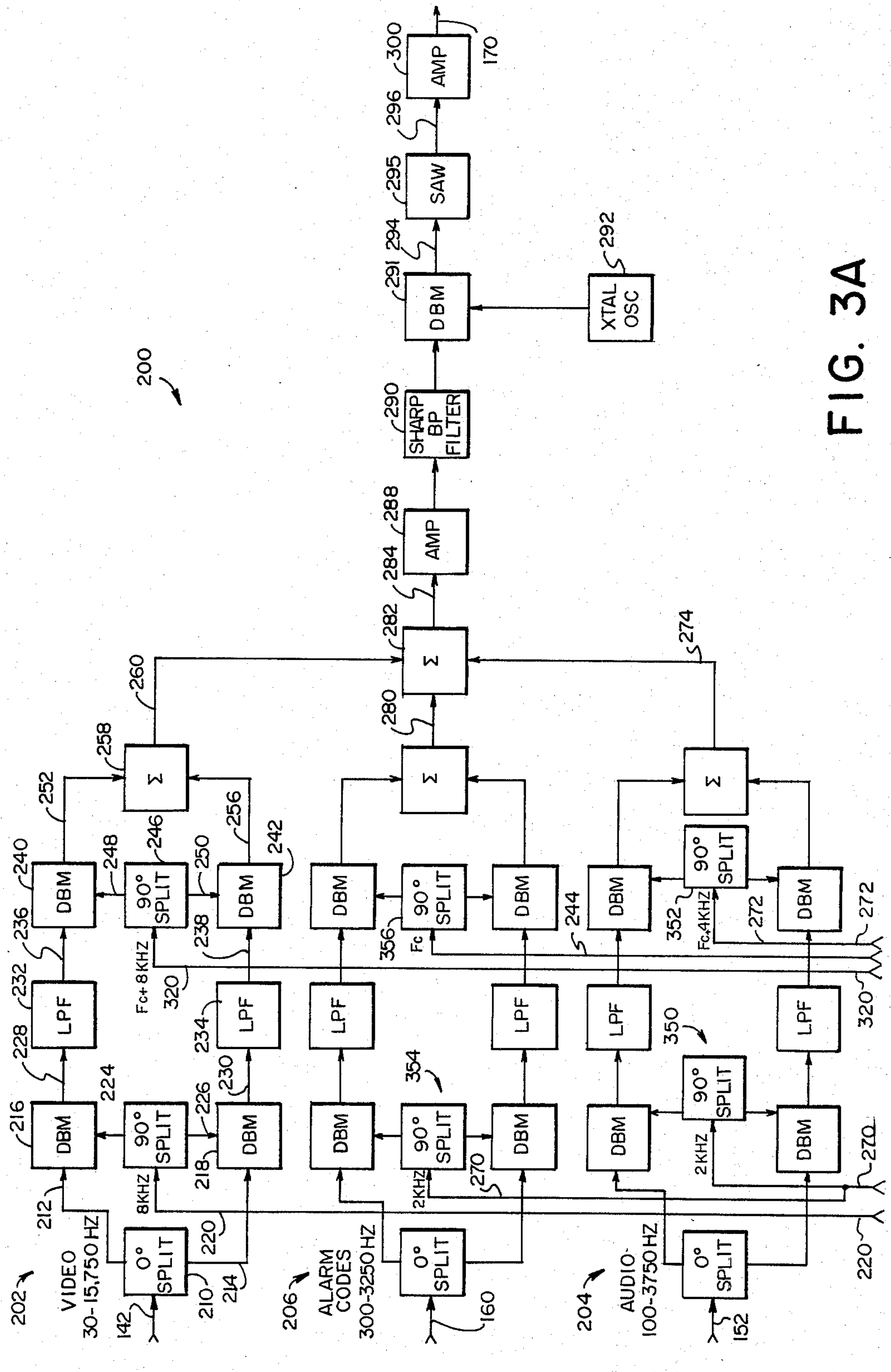
FIGS. 3A and 3B comprise a block diagram of a "Weaver Method" single side band modulator which is part of the interface unit transmitter shown in FIG. 2 and is preferably used to channelize security information onto the carrier medium.
Figure 3B:
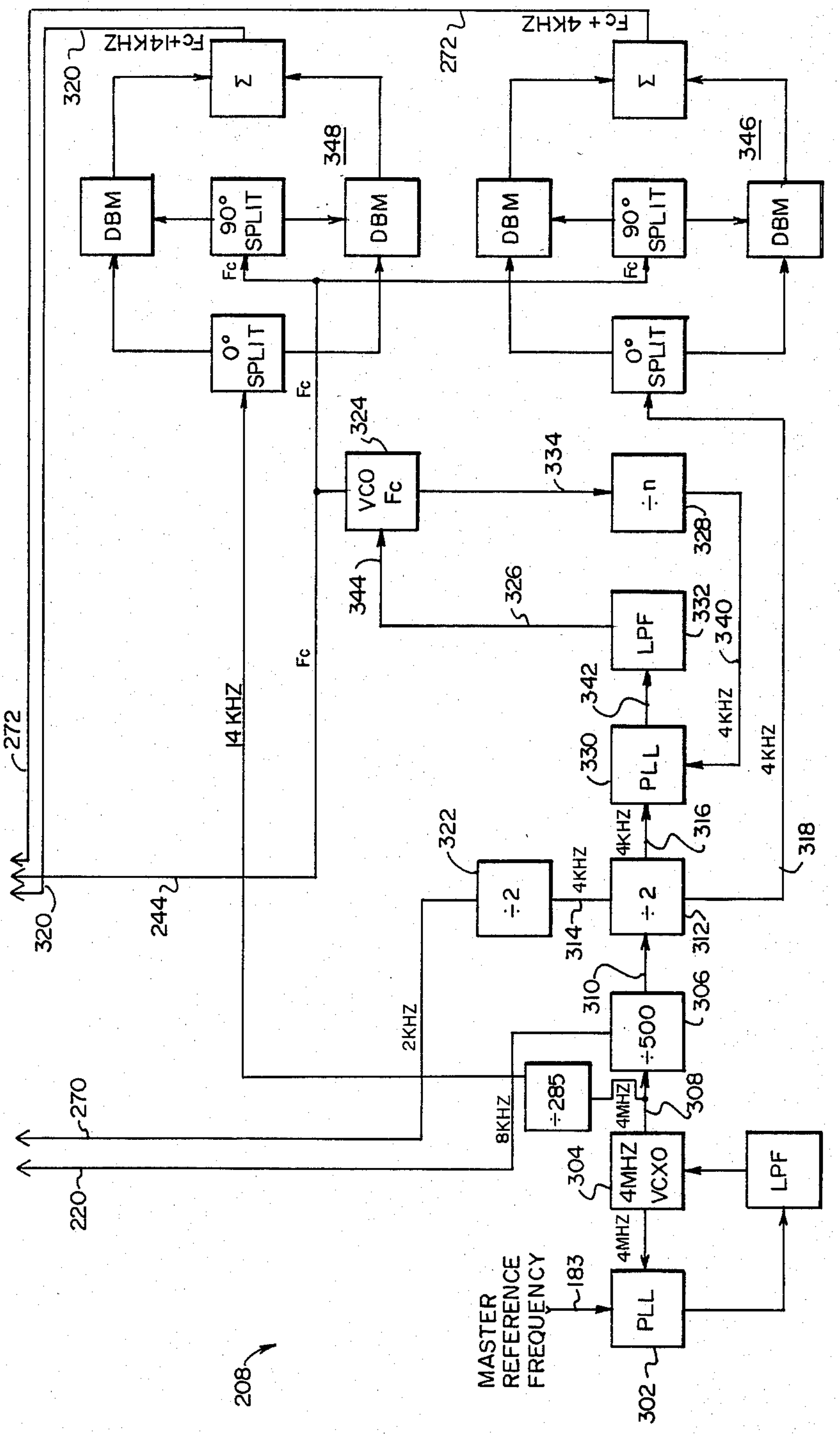

Turning to FIG. 3B, the key frequency generating circuit 208 generates first stage "Weaver Method" carrier frequencies having nominal values of 8 khz (line 220) for video modulator 202 and 2 khz (line 270) for both the audio modulator 204 and the alarm code modulator 206. The first stage carrier frequencies randomly vary under control of the master reference frequency. The key frequency generating circuit also generates second stage "Weaver Method" carrier frequencies $f_c$ (line 244) for the alarm code modulator 206, $f_c+4$ khz (line 272) for the audio modulator 204, and $f_c+8$ khz (line 320) for the video modulator 202. The key frequency $f_c$ and the other second stage carrier frequencies, randomly vary $\pm 500$ hz under the control of the master reference frequency (line 183). The key frequency $f_c$ is used as the assigned carrier frequency for the particular remote facility.

With respect to the key frequency generating circuit 208 (FIG. 3B), the randomly varying master reference frequency on line 183 is connected to a phase lock loop control circuit 302 which controls a 4 mhz voltage controlled crystal oscillator (VCXO) 304 so that the voltage controlled crystal oscillator 304 produces a 4 mhz frequency (line 308) which varies randomly ($\pm 500$ hz) in response to the randomly varying master reference frequency. The output (line 308) of voltage controlled crystal oscillator 304 is then divided by 500 by divider circuit 306 which produces a randomly varying 8 khz (±1 hz) frequency on lines 220 and 310. The 4 mhz signal on line 308 is also divided by 285 by divider 305 to produce a randomly varying 14 khz (±1.75 hz) frquency on line 307. The 8 khz frequency on line 220 is used as the first stage carrier frequency for the video modulator 202 (FIG. 3A). The 8 khz frequency on line 310 is divided by 2 by divider circuit 312 to produce a randomly varying 4 khz (±½ hz) frequency on lines 314, 316, and 318. The 4 khz frequency on line 314 is divided by 2 by divider circuit 322 which produces a randomly varying 2 khz (±¼ hz) frequency on line 270 which is used as the first stage carrier frequency of both the alarm code modulator 206 and the audio modulator 204.

The other 4 khz frequencies on lines 316 and 318 and the 14 khz frequency on line 307 are used to generate the key frequency $f_c$ (on line 244), $f_c+4$ khz (line 272), and $f_c\pm14$ khz (line 320). In order to generate $f_c$ and its related frequencies, a voltage controlled oscillator 324 is connected into phase lock loop 326 which comprises the voltage control oscillator 324, key dividing circuit 328, phase lock loop control 330, and low pass filter 332. The value of n for divider circuit 328 is selected so that the value of $f_c$ on line 334 when divided by the value n of divider circuit 328 equals a nominal 4 khz on line 340. The nominal 4 khz frequency on line 340 is then compared to the 4 khz synchronizing signal on line 316 by phase lock loop control 330 which produces an error voltage at its output 342. The error voltage (line 342) is connected via low pass filter 332 to the input 344 of voltage control oscillator 324. As a result, the voltage control oscillator 324 produces a frequency $f_c$ at its output 244 which is an integer multiple of the 4 khz frequency available on line 316 and varies randomly (±1 khz) under the control of the master reference frequency.

A typical frequency range for $f_c$ would be from 40.160 mhz to 45.824 mhz. As a result, n for divider circuit 328 would range from 10,045 to 11,456. For a particular remote facility, the value of n determines the value of $f_c$ and the particular sub-channel assigned to that remote location. For the purposes of further discussion of the operation of the single side band modulator 200, $f_c$ will be assumed, by way of example only, to be 40 mhz and n will be equal to 10,000.

In order to generate the second stage modulation frequency for the audio modulator 204, where that frequency equals $f_c+4$ khz, $f_c$ on line 244 is connected to frequency translation circuit 346 (FIG. 3B). $F_c$ on line 244 is modulated by the 4 khz reference frequency on line 318 providing in conventional fashion a frequency on line 272 having a frequency of $f_c+4$ khz. In like manner, translation circuit 348 uses $f_c$ on line 244 which is modulated by the 14 khz frequency on line 307 to produce a frequency of $f_c+14$ khz on line 320.

Turning to the video "Weaver Method" modulator 202 (FIG. 3A), the slow scan video signal on line 142 having a bandwidth between 30 and 15,750 hz is connected to a two-way 0° splitter 210 which separates the slow scan video signal into two, in-phase components one on line 212 and one on line 214. The in-phase video components on lines 212 and 214 are connected to double balance modulators 216 and 218 respectively. The first stage modulating frequency of 8 khz is provided on line 220. The first stage modulating frequency on line 220 is split by two-way 90° splitter 222 into two carrier signals (224 and 226) which are respectively modulated by the in-phase compressed video signals on lines 212 and 214 in double balance modulators 216 and 218. The double balanced modulators 216 and 218 each produce an upper and lower side band on either side of a suppressed, randomly varying 8 khz carrier with the lower side band having all of the slow scan video information available in folded over fashion.

The folded side bands on lines 228 and 230 are passed through d.c. connected low pass filters 232 and 234 which pass frequencies of 0 to 8 khz and thus eliminate the upper side bands. The lower folded side bands at the output of the low pass filters on lines 236 and 238 are connected to second stage double balanced modulators 240 and 242 where the folded lower side bands are unfolded by modulating a randomly varying frequency $f_c+14$ khz on line 320 with each lower side band. The $f_c+14$ khz carrier frequency is split by splitter 246 into two components of the same carrier frequency on lines 248 and 250, shifted 90° with respect to each other.

The double balanced modulators 240 and 242 produce two side bands with the carrier frequency $f_c+14$ khz supressed on lines 252 and 256. The lower side bands from each double balanced modulator are out-of-phase with each other, and the upper side bands of each double balanced modulator are in phase with each other. The two signals on lines 252 and 256 are then added in combining circuit 258 so that the in-phase upper side band signals add and the out-of-phase lower side band signals cancel each other. The resulting output on line 260 is the upper side band of the slow scan video information with the carrier frequency $f_c+14$ khz suppressed. The upper side band is approximately 16 khz in width and is centered on the carrier frequency, $f_c+14$ khz (285, FIG. 7).

The audio signal on line 152 having a bandwidth between 100–3750 hz is processed by "Weaver Method" modulator 204 (FIG. 3A) in the same fashion as the compressed video signal. The first stage modulation 350 uses the randomly varying 2 khz on line 270. The second stage 352 of the audio modulator 204 uses the randomly varying carrier frequency $f_c+4$ khz on line 272. The output of audio "Weaver Method" modulator 204 on line 274 is the upper side band of the modulating audio signal with the carrier frequency $f_c+4$ khz suppressed. The upper side band information is approximately 4 khz in width and is centered on the carrier frequency $f_c+4$ khz (287, FIG. 7).

The alarm code information from FSK modem and UART 158 has a bandwidth of 300–3250 hz and is connected via line 160 to the alarm code "Weaver Method" modulator 206. The alarm code modulator 206 operates in the same fashion as the audio modulator 204 and uses the randomly varying 2 khz frequency on line 270 at its first stage 354 and uses carrier frequency, $f_c$, on line 272 at its second stage 356. The resulting output on line 280 is the upper side band of the alarm code with carrier key frequency $f_c$ suppressed. The upper side band of the alarm code is approximately 4 khz in width and is centered on modulating key frequency $f_c$ (289, FIG. 7).

Figure 7:
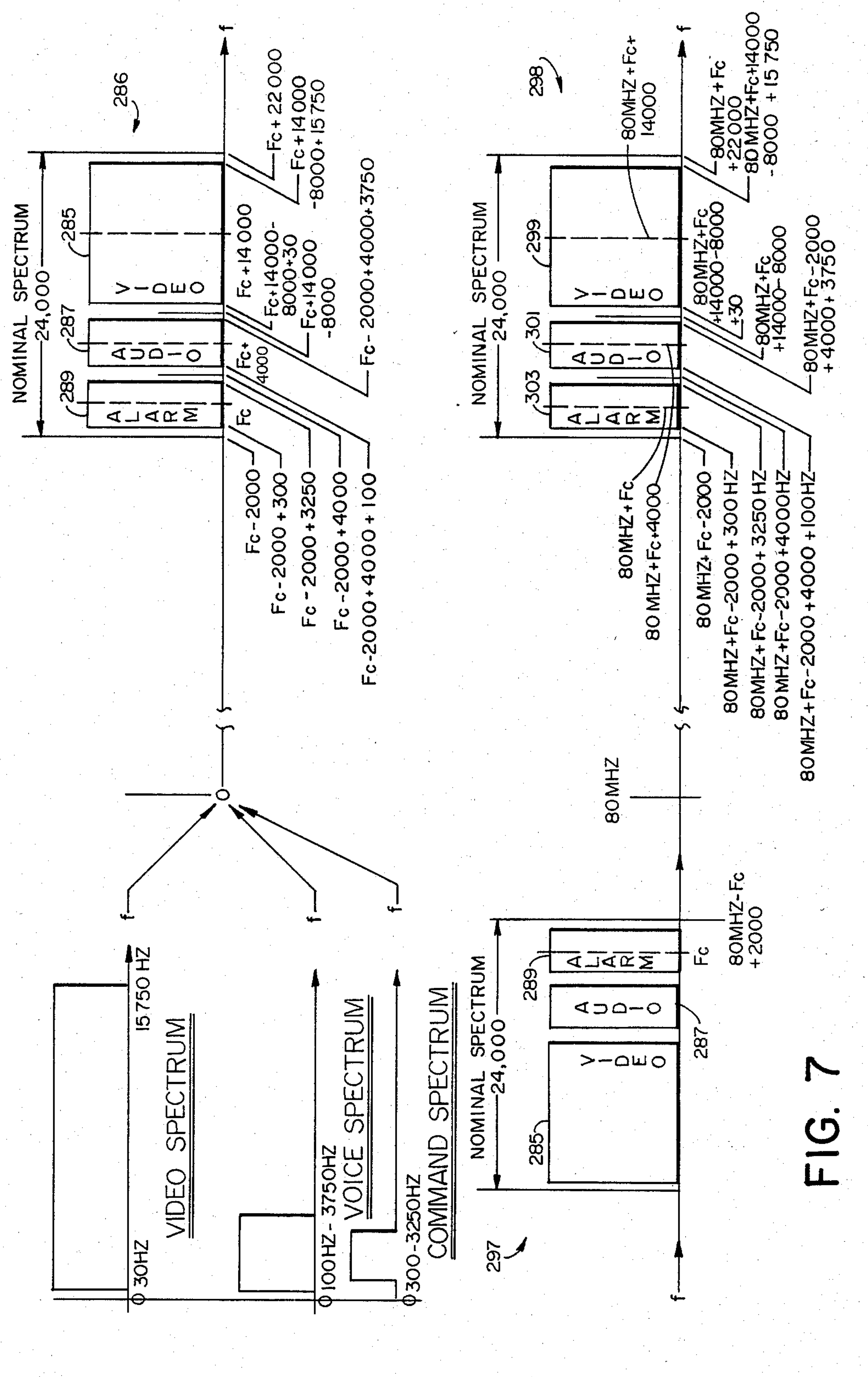
FIG. 7 is a diagram of a frequency spectrum of the processed security information for transmission downstream to the central station.

The output signals from the "Weaver Method" modulators 202, 204, and 206 on lines 260, 274, and 280 are summed by summing circuit 282 producing a composite signal containing the processed security information on line 284 and having the frequency characteristics shown in FIG. 7 at 286. The compressed video information is within frequency spectrum 285; the audio information is within frequency spectrum 287; and the alarm code is within frequency spectrum 289.

Returning to FIG. 3A, the processed security information on line 284 is amplified by amplifier 288 and then put through a sharp band pass filter 290 which assures that only the information within the spectrum 286 shown in FIG. 7 is passed to double balance modulator 291. The double balanced modulator 291 by means of crystal controlled oscillator 292 translates the information up in frequency by 80 mhz, for example, so that the information is placed on channel "A" on a standard television closed circuit cable. The resulting translated signal on line 294 has the frequency spectrum shown in FIG. 7 with both the lower side band 297 and the upper side band 298 present on either side of the 80 mhz channel "A" carrier frequency. The signal on line 294 is then passed through a surface accoustic wave ("SAW") side band filter 295 which rejects the lower side band leaving only the upper side band available on line 296. The signal on line 296 is shown at 298 in FIG. 7. The video information is within the frequency spectrum 299; the audio information is within the frequency spectrum 301; and the alarm code is within the frequency spectrum 303. The upper side band on line 296 is then amplified by amplifier 300 and made available at the output 170 of single side band modulator 200.

The processed security information collected by onsite surveillance equipment at the remote security installation 10 shown in FIG. 1 is transmitted to the central station 600 by means of coaxial cable 118 or other suitable transmission medium as previously described. In addition, command information is transmitted from the central station 600 to the remote installation 10 by means of the same coaxial cable 118.

The downstream direction of the coaxial cable is defined to be the direction from the remote installation to the central station, and the upstream direction of the coaxial cable is defined to be the direction from the central station to the remote installation. In the downstream direction, for example, one standard 6 mhz cable channel may typically be allocated for the security system. Each remote installation that is transmitting processed security information, including slow scan video, audio, and alarm codes, requires 24 khz of bandwidth (FIG. 7), including guard band, in order to transmit its security information downstream. As a result, a 6 mhz cable channel can accomodate 250 remote security installations that are transmitting simultaneously slow scan video, audio, and alarm codes.

In the upstream direction, the central station 600 transmits command information which utilizes Only 8 khz, including guard bands for each remote installation. As a result, a 2 mhz upstream cable channel can easily handle 250 remote installations.

Turning to FIG. 5, the coaxial cable 118 is connected to a directional coupler 606. The directional coupler 606 has an output (line 608) for connecting downstream processed security information to cable channel interface 610 and an input (line 622) for connecting upstream command information from the cable channel interface 610 to the directional coupler 606.

Figure 6:
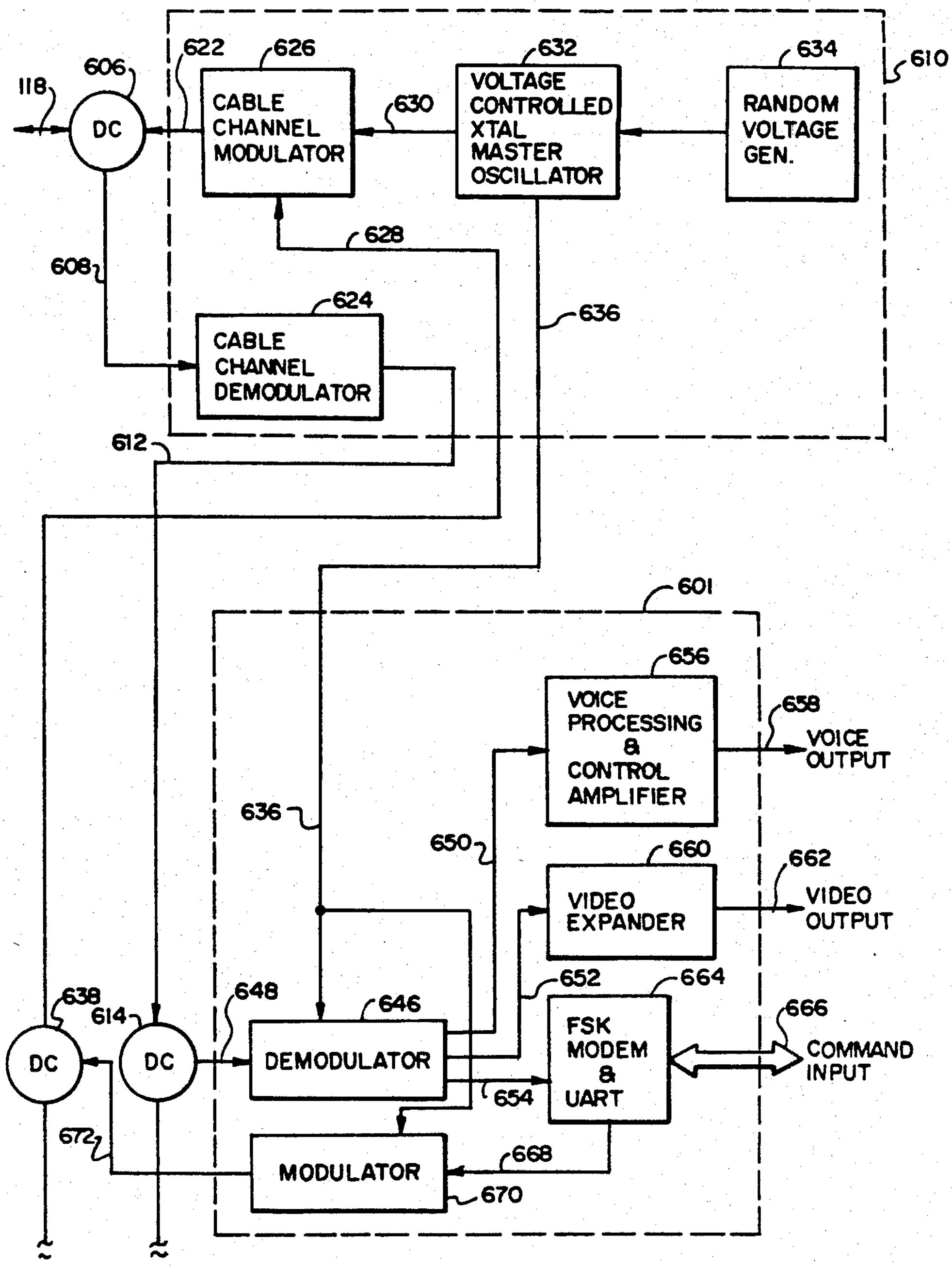
FIG. 6 is the interface unit receiver which is part of the central monitoring station equipment.

Turning to FIG. 6 there is shown a more detailed block diagram of the cable channel interface 610. In the downstream direction, the security information from all remote installations on line 608 is connected to a cable channel demodulator 624. Cable channel demodulator 624 is a conventional single side band frequency converter that selects the particular 6 mhz cable channel, recovers the security information, including all of the sub-channels received from each remote installation, and connects the security information to output 612. In the upstream direction, cable channel single side band modulator 626 is a conventional single side band frequency converter which receives the command information for all of the sub-channels on line 628 and translates the command information on line 628 to the frequency of the particular 2 mhz upstream cable channel that is dedicated to use for security purposes.

The information transmitted in the upstream direction and available at line 622 includes the command information for each remote installation from line 628 and the master reference frequency from line 630 which is transmitted as a partially suppressed carrier.

The master reference frequency on line 630 is generated by a voltage controlled crystal oscillator 632 which is controlled by random voltage generator 634. As a result, the voltage controlled oscillator 632 produces a master reference frequency which varies randomly within a specified frequency range. The randomly varying master reference frequency on line 630 is transmitted with the upstream command information and is used to generate the modulating key frequencies at the interface unit transmitters at the remote installation. The master reference frequency is also available at output 636 from the voltage controlled oscillator 632 and is used to generate the key frequencies that are used for demodulating the security information that is transmitted back to the central station from the remote installations. As a result, the entire security system is tied together by the randomly varying master reference frequency.

Referring back to FIG. 5, it can be seen that there is only one cable channel interface 610 at the central station 600. The downstream information from cable channel interface 610 on line 612 is connected via directional couplers 614, 616, 618, and 620 each of which is associated with an interface unit receiver 601, 602, 603, and 604. In the upstream direction, the command information from the interface unit receivers 601, 602, 603, and 604 is connected via directional couplers 638, 640, 642, and 644 to line 628 to the cable channel interface 610.

It should be understood that there is an interface unit receiver with associated directional couplers both upstream and downstream for each remote installation being monitored. A typical remote installation, which transmits processed security information, including compressed video, audio, and alarm codes, requires 24 khz of bandwidth (FIG. 7), including guard bands. Therefore, if a 6 mhz downstream cable channel is available for transmitting security information, 250 remote locations can be monitored simultaneously, and the central station 600 shown in FIG. 5 would have 250 interface unit receivers such as 601.

Turning to FIG. 6, there is shown for purposes of illustration a block diagram of interface unit receiver 601 which includes single side band sub-channel demodulator 646 which by means of its assigned key frequency recovers the security information being carried in the sub-channel assigned to its associated remote installation. The single side band demodulator 646 receives all of the sub-channels carried in the dedicated 6 mhz channel via directional coupler 614 and input line 648, but it recovers only the security information on the sub-channel having its assigned key frequency.

The particular demodulating key frequency $f_c$ for the particular remote installation serviced by interface unit receiver 601 is generated from the master reference frequency on line 336 in the same way that the modulating key frequency $f_c$ for that remote installation is generated from the master reference frequency in modulating frequency generating circuit 208 shown in FIG. 3B and previously described. It should be appreciated that the key frequency $f_c$ relating to interface unit receiver 601 is unique to that interface unit receiver and is selected by means of voltage controlled oscillator and a particular key divider circuit such as 328 of frequency generating circuit 208 of FIG. 3B.

Once $f_c$ for the particular interface unit 601 has been generated, the single side band sub-channel demodulator 646 operates in the same manner as the single side band sub-channel modulator 200 shown in FIG. 3A with the obvious modifications required to convert a modulator circuit to a matched demodulator circuit. As a result of demodulating the security information on line 648 by single side band sub-channel demodulator 646, the audio information is available at output 650, the compressed video information is available at output 652, and the downstream alarm code is available at output 654.

Figure 4:
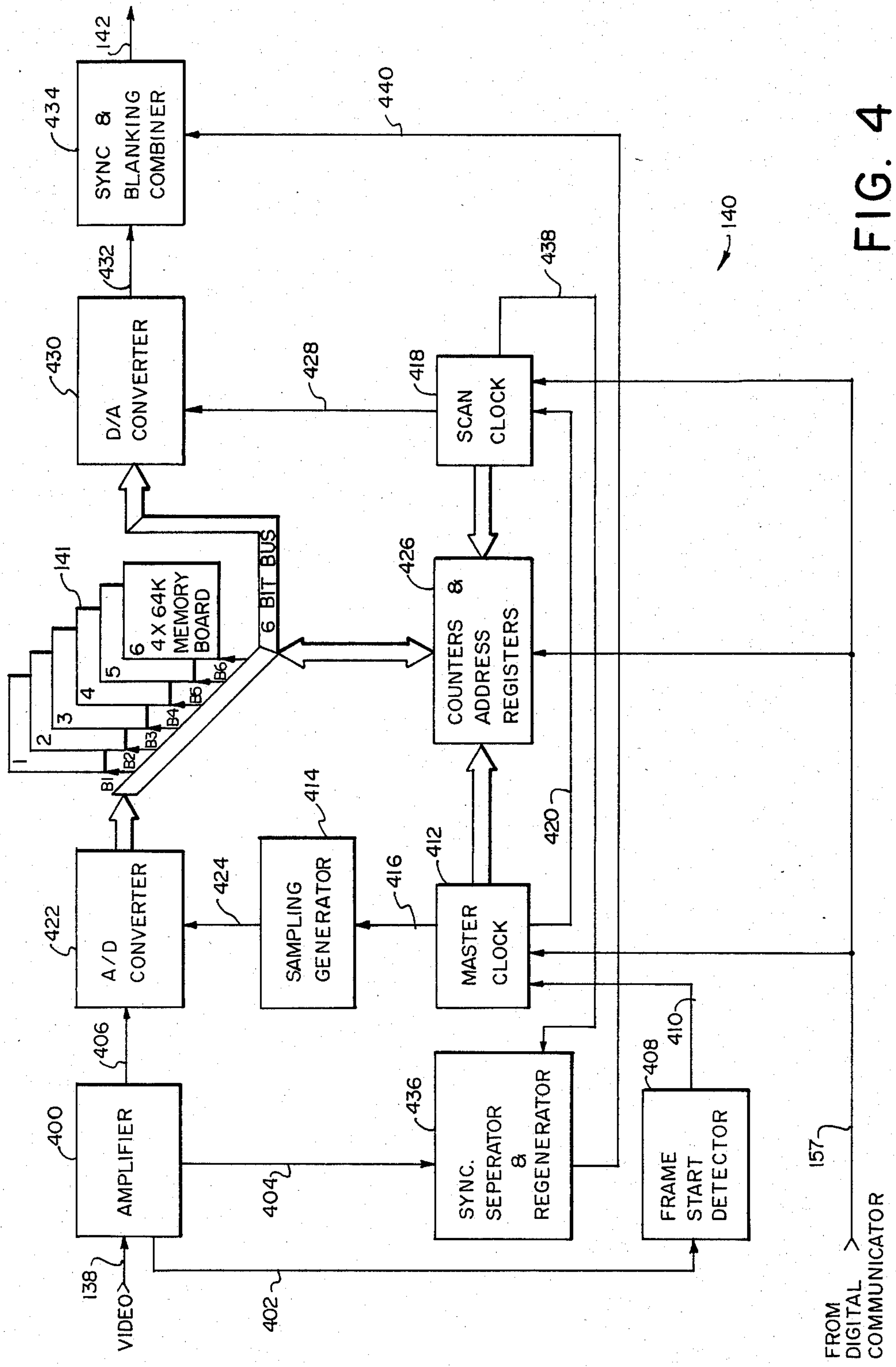
FIG. 4 is a block diagram of a video compressor/expander which is part of the interface unit transmitter and is used to compress or expand television video information.

With continuing reference to FIG. 6, the audio signals (line 650) are connected to voice processing and control amplifier 656 which produces a reconstituted audio signal on line 658. The slow scan or compressed video signal on line 652 is connected to video expander 660 which produces an expanded video signal on line 662. It should be appreciated that the video expander 660 employs the same circuitry as the video compressor 140 shown in FIG. 4. When the circuitry shown in FIG. 4 is used as a video expander, the A/D converter 422 is sampled at the slow scan video rate (31.5 khz or 350 khz) and the D/A converter 430 is scanned at the 9 mhz rate to produce the expanded video signal on line 662 of FIG. 6.

The downstream alarm code is connected through FSK modem and UART 664, and the resulting alarm code is transmitted on bus 666 to micro processor 684 and master switcher 682 (FIG. 5). The upstream command information from FSK modem and UART 664 is connected via line 668 to single side band modulator 670 which under the control of a master reference frequency generates the particular key frequency $f_c$ for interface unit receiver 601 and produces a single side band modulated command signal on line 672 which is connected via directional coupler 638 to the cable channel interface 610 for transmission to the particular remote installation being monitored by interface unit receiver 601.

Returning to FIG. 5, and with special attention to interface unit receiver 601, the expanded video output on line 662 is connected to monitor 680 which continuously displays the video information being received from the remote installation being monitored by interface unit receiver 601. The expanded video output on line 662 as well as the audio output on line 658 are connected to master switcher 682. In addition, the video and audio outputs from the other interface unit receivers 602, 603, 604, etc. are connected to the master switcher 682.

The master switcher 682, on command of 684 and 692 samples the audio and video signals from the interface unit receivers (601, 602, 603, 604, etc.) The sampled video signal on line 685 is connected to auxilary monitor 686, and the sampled audio signal on line 694 is connected to earphones 696 via status/command computer 692. On command of microprocessor 684 and command computer 692, the master switcher can select a pair of particular audio and video signals from a particular interface unit receiver to be displayed on the auxillary monitor 686 and to be sent via microwave link 688 to remote monitor 690 which may be at a police station or other facility from which aid can be provided.

The command computer 692 and microprocessor 684 continuously monitors bus 666 for an alarm code from any interface unit receiver. If an alarm code is received on bus 666, the computer 692 determines from the code the remote installation and the location of the on-site surveillance equipment that has recorded the alarm. The computer then transmits command signals on bus 666 that locks master switcher 682 onto the particular interface unit receiver that corresponds to the remote installation that transmitted the alarm code. In addition the computer operator can also communicate audibly with the alarm location by means of microphone 698 which produces an audio signal that is transmitted upstream on the command sub-channel.

In the absence of an alarm, the computer can, at the operator's option, order display of a particular on-site location on the auxillary monitor by means of an upstream command to switcher 100 (FIG. 1) and a command to master switcher 682.

I claim:

1. Security and surveillance system comprising a central station connected to a plurality of remote installations by means of a transmission medium having a finite information bandwidth wherein:

a. each remote installation comprises:

i. a plurality of surveillance equipment associated with a plurality of monitored locations for collecting raw security information including audio, video, and alarm information;

ii. switching means with a plurality of inputs connected to the surveillance equipment for sampling the security information at its inputs in serial fashion and providing the security information at its output, the switching means being capable of locking onto a particular input in response to an alarm condition at a particular monitored location; and iii. interface unit transmitter means connected to the output of the switching means for receiving and processing the raw security information including:

(a) video compressor means for compressing the video information in bandwidth to provide compressed video information;

(b) alarm decoder means for generating an alarm code from the alarm information in order to identify the particular location of an alarm condition;

(c) sub-channel modulator which uses a key frequency unique to each remote installation to modulate and thereby sub-channelize the audio information, the compressed video information, and the alarm code to provide processed, sub-channelized security information within a base band frequency spectrum of predetermined size; and (d) transmitter means including channel modulator to translate in frequency the base band frequency spectrum with its processed, sub-channelized security information into an available downstream channel of the transmission medium; and b. the central station comprises:

i. receiver means including channel demodulator connected to the transmission medium for recovering the processed, sub-channelized security information from the available downstream medium channel;

ii. a plurality of interface unit receivers each associated with a remote installation and connected to the channel demodulator for reprocessing the processed, sub-channelized security information including:

(a) sub-channel demodulator which uses the key frequency unique to the associated remote installation to recover the audio information, the compressed video information, and the alarm code from the sub-channelized security information within the base band frequency spectrum; and (b) video expander means for expanding the compressed video information to provide the video information; and iii. master switching means connected to the interface unit receivers for selecting for display on command particular audio information and video information; and iv. command unit connected to the master switching means and the interface unit receiver for controlling the master switching means in response to the alarm code.

2. The security system of claim 1 wherein:

a. each interface unit receiver at the central station further includes a command sub-channel modulator connected to a command computer which uses the key frequency assigned to the interface unit receiver modulator and thereby sub-channelizes command information from the command computer within a second base band frequency of predetermined size;

b. the receiver means at the central station further includes command channel modulator to translate in frequency the second base band frequency spectrum containing the command information into an available upstream channel of the transmission medium;

c. transmitter means at each remote installation further includes command channel demodulator connected to the transmission medium for recovering the command information from the available upstream channel; and d. the interface unit transmitter further includes command sub-channel demodulator which uses the assigned key frequency to recover the command information.

3. The security system of claim 2, wherein the receiver means further includes a random frequency generator which produces a randomly varying master reference frequency that is transmitted on the available upstream channel as a suppressed carrier and wherein the interface unit transmitter and the interface unit receiver each have a key frequency generator which is connected to the master reference frequency in order to generate the assigned key frequency which randomly varies in synchronization with the randomly varying master reference frequency.

4. The security system of claim 1, wherein the alarm decoder means includes means for determining whether the transmission medium is operable and providing an alert signal for a transmission medium failure and wherein the interface unit transmitter further includes logic means connected to the alarm decoder means for processing the alarm code and alert signal in order to activate an interconnected on-site recording means for storing security information.

5. The security system of claim 4, wherein the logic means processes the alarm code and alert signal in order to activate an interconnected backup transmission medium to provide security information to the central station.

* * * * *